Dec. 28, 1948. R. S. HOLMES 2,457,676
FREQUENCY MEASURING CIRCUIT
Filed Feb. 25, 1943
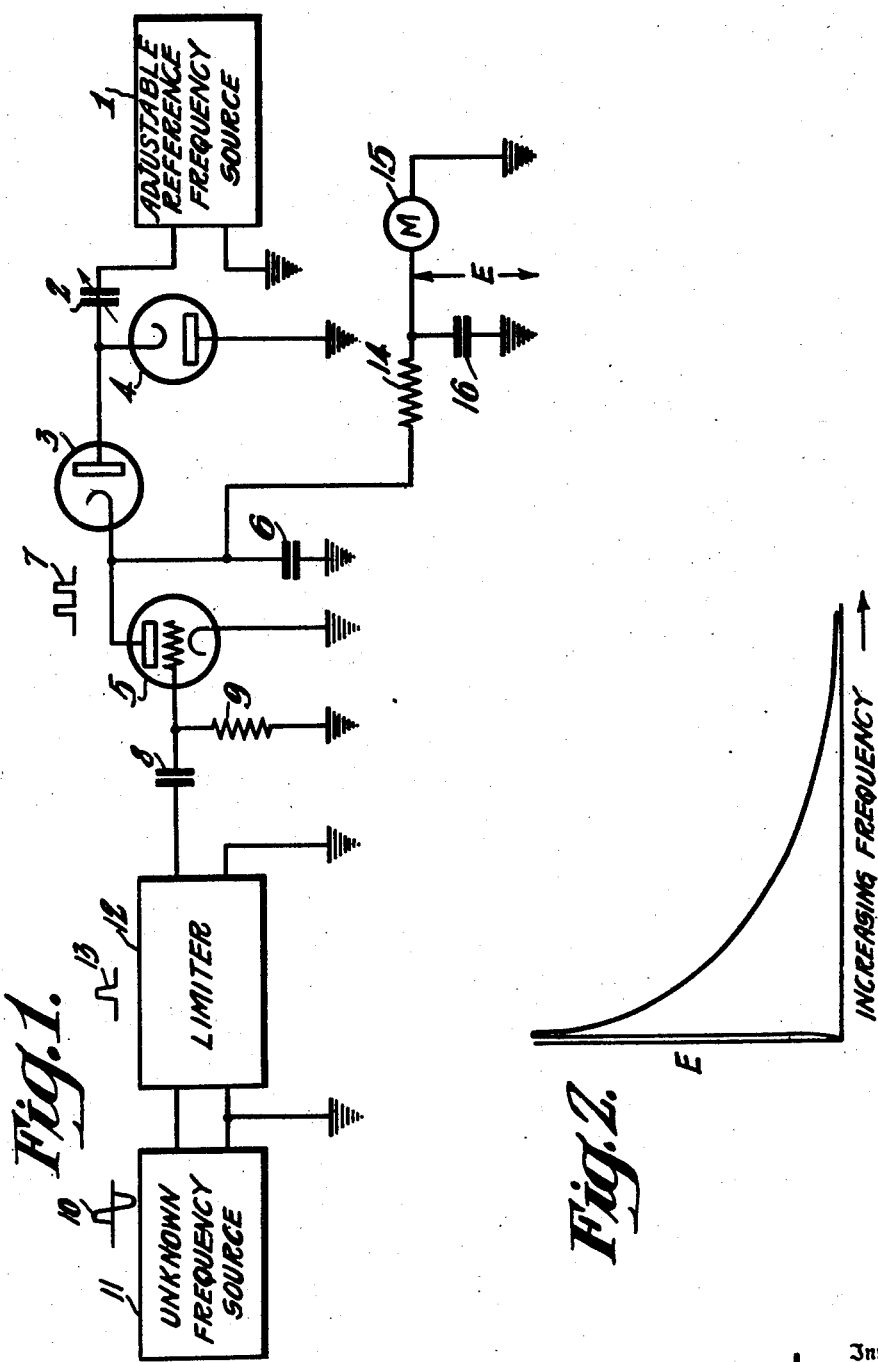
Inventor
RALPH S. HOLMES
Attorney Patented Dec. 28, 1948

2,457,676

UNITED STATES PATENT OFFICE 2,457,676

FREQUENCY MEASURING CIRCUIT

Ralph S. Holmes, Princeton, N. J., assignor to Radio Corporation of America, a corporation of Delaware Application February 25, 1943, Serial No. 477,164

8 Claims. (Cl. 175—368)

This invention relates generally to counter circuits and particularly to frequency measuring circuits for deriving a D.-C. voltage the amplitude of which is a predetermined function of the frequency of an applied potential.

Pulse or frequency counting circuits have wide utility in the communication or radio navigation fields. The instant invention provides a novel and improved circuit for deriving a D.-C. voltage the amplitude of which is a predetermined function of the unkown frequency of a voltage comprising alternating or pulsating D.-C. potentials. Briefly, the invention depends upon the charging and discharging of a storage capacitor and means for indicating the resulting charge thereon. The capacitor is charged by positive pulses derived from the rectified output of a reference frequency source such as a stable thermionic tube oscillator. The storage capacitor is connected across the anode circuit of a conventional thermionic tube. The tube includes in its control electrode circuit a conventional grid leak-grid capacitor network whereby the tube conducts in the absence of applied signals. When signals of positive polarity are derived from the signal source of frequency to be measured through a conventional amplitude-limiter circuit and are applied to the grid leak-grid capacitor network, the resultant potentials applied to the tube control electrode alternately cause the tube to pass and to block anode current in the manner characteristic of a grid leak detector. By proper selection of the constants of the grid leak-grid capacitor network, the conducting period may be made short relative to the non-conducting period. The storage capacitor connected across the tube anode circuit is permitted to continue charging during the relatively long non-conducting periods and to discharge during each conducting period. The higher the frequency of incoming pulses and consequently the frequency of the discharge intervals, the lower will be the resultant charge on the storage capacitor. The resultant charges upon the storage capacitor in the anode circuit of the thermionic tube may be filtered, or integrated, by a conventional resistor-capacitor network and applied to a D.-C. voltage indicating instrument to indicate directly the frequency of the source to be measured. It should be noted that with the simple circuit to be described in detail hereinafter, the output voltage, as indicated by the indicating instrument, will be inversely proportional to the frequency of the applied source.

Among the objects of the invention are to provide a new and improved method of and means for indicating the frequency of a voltage source. Another object is to provide an improved method of and means for deriving a D.-C. potential which is a predetermined function of the frequency of an applied potential source. Still another object is to provide an improved method of and means for deriving a D.-C. potential which is a predetermined function of the frequency of an applied potential, in which said function is determined by the circuit constants and by the frequency and amplitude of a reference frequency source. Still another object of the invention is to provide an improved method of and means for charging a storage capacitor by rectified potentials by a reference frequency source, discharging said capacitor as a function of a unknown frequency source, and indicating the frequency of said unknown frequency source in terms of a D.-C. potential derived from the storage capacitor.

The invention will be more clearly understood by reference to the accompanying drawing of which Figure 1 is a schematic circuit diagram of one embodiment thereof, and Figure 2 is a graph indicating the relation between the output D.-C. potentials and the applied frequencies in the circuit of Figure 1. Similar reference numerals are applied to similar elements throughout the drawing.

Referring to Figure 1, a reference frequency source, such as a relatively stable thermionic tube oscillator 1, is connected through a variable capacitor, or other variable reactance 2, to the anode of a first diode 3. The anode of the first diode 3 is connected to the cathode of a second diode 4. The anode of the second diode 4 is grounded. The cathode of the first diode 3 is connected to the anode of a triode 5 and to one terminal of a storage capacitor 6. The remaining terminal of the storage capacitor 6 is grounded. The cathode of the triode 5 is also grounded.

Alternating potentials, derived from the reference frequency source 1, will therefore be applied to the storage capacitor 6 and the anode of the triode 5 as positive pulsating potentials 7, which will charge the storage capacitor 6. The negative half cycles derived from the reference frequency source 1 will be conducted to ground through the second diode 4. The amplitude of the positive voltage pulses 7 will depend upon the voltage amplitude derived from the reference frequency source 1 and the series reactance of the variable capacitor 2.

The control electrode circuit of the triode 5 includes a conventional grid capacitor 8 and grid leak resistor 9. One terminal of the grid leak resistor 9 is connected to ground. The thermionic tube control electrode circuit will provide a current conducting path from the anode to the cathode of the triode 5 in the absence of applied signals through the control electrode capacitor 8. Therefore, with no signal input through the control electrode capacitor 8, the triode 5 will continuously discharge the storage capacitor 6. However, if signals 10 of the unknown frequency are derived from a source 11, and applied through a voltage amplitude limiter 12 to the control electrode circuit of the triode 5 through the control electrode capacitor 8, these limited potentials 13 will provide intervals during which the triode 5 will be non-conducting. During such intervals the charge upon the storage capacitor 6 will be a predetermined function of the charging potentials 7 and the frequency of the limited potentials 13.

The operational sequence of the triode 5 may be described as follows:

Due to the fact that the grid is connected to ground through the grid resistor 9, the triode 5 normally will conduct in accordance with its normal anode-cathode impedance and will maintain the storage capacitor 6 in a substantially discharged condition in the absence of input signals applied to the grid of the tube. However, when the positive signal pulses 13 are applied to the grid of the triode 5 through the grid capacitor 8, the grid is driven positive to lower further the anode-cathode impedance of the triode 5, causing grid current to flow through the grid resistor 9, which thereby immediately lowers the grid potential to that of the cathode. At the end of the applied pulse, the grid is driven to a relatively high negative value which blocks the anode-cathode circuit of the tube.

Due to the resultant charge upon the grid capacitor 8, the grid of the triode 5 remains in a blocked condition for an interval determined by the time-constant of the grid capacitor and grid resistor, which characteristic is selected to be longer than the repetition period of the applied pulses 13. The next succeeding applied pulse 13 again applies a positive potential to the grid of the triode 5, again greatly lowering the anode-cathode impedance of the tube, which almost immediately returns to cathode or ground potential. At the end of the second pulse, the grid again is driven negatively to a blocking condition. Thus the applied pulses control the triode 5 to permit charges to accumulate on the storage capacitor 6 as a function of the charging potentials applied thereto through the first diode 3. The foregoing operation is thus comparable to the normal action of a triode which is biased by means of a grid condenser and grid leak having a time constant greater than the applied signal repetition time.

It should be understood that the frequency of the reference frequency source 1 should be considerably higher than the highest unknown frequency to be measured, and that the time constant of the control electrode network 8, 9 should be longer than the duration of a single cycle of the lowest frequency to be measured. For example, if the reference frequency derived from the source 1 is 10 cycles, and the unknown frequency from the source 11 is of the order of 1 cycle, the capacitor 8 should be 1 microfarad for a grid leak 9 of 10 megohms, thereby providing a time constant of 10 seconds. Under these conditions, the resulting charge upon the storage capacitor 6 will be proportional to the ratio of the reference frequency to the input signal frequency.

The ungrounded terminal of the storage capacitor 6 is connected through a filter resistor 14 to one terminal of a D.-C. voltage indicating instrument 15 and one terminal of a by-pass capacitor 16. The remaining terminals of the by-pass capacitor 16 and the indicating instrument 15 are grounded. The network 14, 16 may be readily calculated to filter effectively the pulsating potentials derived from the storage capacitor 6 to provide a relatively constant voltage E across the indicating instrument 15. This voltage will be substantially inversely proportional to the frequency of the unknown frequency source 11.

Referring to Figure 2, the relation of the voltage output E, applied to the indicating instrument 15, is illustrated with respect to the frequency of the unknown fequency source 11. It should be understood that the values along the voltage and frequency coordinates may be varied by adjusting the frequency and amplitude of the reference frequency source as well as by selecting suitable values for the series reactor 2 and the storage capacitor 6. For example, good indication sensitivity is provided when elements 2 and 6 have capacitances of 50 and 500 micromicrofarads, respectively, with a standard reference frequency of 20 kilocycles. It is desirable that the time constant of the storage capacitor charging circuit be such that the storage capacitor 6 shall not become fully charged during any single non-conducting interval of the tube 5.

Thus the invention described comprises an improved method of and means for indicating directly the frequency of potentials applied to a thermionic tube circuit in terms of the D.-C. voltage derived from a storage capacitor connected in the anode circuit of the thermionic tube, while providing no indication in the absence of said applied potentials.

I claim as my invention:

1. A frequency measuring circuit for a source of input signals the frequency of which is to be determined, including a source of reference signals of frequency substantially higher than the highest frequency to be measured, a capacitor, means including said reference source for applying unilateral pulses of substantially equal potential to said capacitor, means responsive to said input signals for discharging said capacitor during a portion of each cycle of said input signals, an integrating circuit, means for applying the resulting charges on said capacitor to said integrating circuit, and means for deriving a voltage from said integrating circuit of amplitude which is an inverse function of said input signal frequency, said derived voltage being of a uniform minimum value in the absence of input signals.

2. A frequency measuring circuit for a source of input signals the frequency of which is to be determined, including a source of reference signals of frequency substantially higher than the highest frequency to be measured, a capacitor, means including said reference source and means of oppositely polarized unilaterally conducting devices for applying unilateral pulses of substantially equal potential to said capacitor, means responsive to said input signals for discharging said capacitor during a portion of each cycle of said input signals, an integrating circuit, means for applying the resulting charges on said capacitor to said integrating circuit, and means for deriving a voltage from said integrating circuit of amplitude which is an inverse function of said input signal frequency, said derived voltage being of a uniform minimum value in the absence of input signals.

3. A frequency measuring circuit for a source of input signals the frequency of which is to be determined, including a source of reference signals of frequency substantially higher than the highest frequency to be measured, a capacitor, means including said reference source and a pair of oppositely polarized unilaterally conducting devices for applying unilateral pulses of substantially equal potential to said capacitor, a thermionic tube responsive to said input signals for discharging said capacitor during a portion of each cycle of said input signals, an integrating circuit, means for applying the resulting charges on said capacitor to said integrating circuit, and means for deriving a voltage from said integrating circuit of amplitude which is an inverse function of said input signal frequency, said derived voltage being of a uniform minimum value in the absence of input signals.

4. Apparatus of the type described in claim 3 including means for adjusting the amplitude of said charging potentials.

5. Apparatus of the type described in claim 3 characterized in that the frequency of said charging potentials is adjustable.

6. A frequency measuring circuit for a source of input signals the frequency of which is to be determined, including a source of reference signals of frequency substantially higher than the highest frequency to be measured, a capacitor, means including said reference source and a pair of oppositely polarized unilaterally conducting devices for applying unilateral pulses of substantially equal potential to said capacitor, a thermionic tube having at least a cathode, a control electrode and an anode responsive to said input signals for discharging said capacitor during a portion of each cycle of said input signals, an automatic bias circuit for said control electrode for biasing said electrode only in response to said input signals, an integrating circuit, means for applying the resulting charges on said capacitor to said integrating circuit, and means for deriving a voltage from said integrating circuit of amplitude which is an inverse function of said input signal frequency, said derived voltage being of a uniform minimum value in the absence of input signals.

7. Apparatus of the type described in claim 6 including an indicator responsive to said voltage derived from said integrating circuit.

8. A frequency measuring circuit for a source of input signals the frequency of which is to be determined, including a source of reference signals of frequency substantially higher than the highest frequency to be measured, a capacitor, means including said reference frequency source and a pair of oppositely polarized unilaterally conducting devices for applying unilateral pulses of substantially equal potential to said capacitor, a thermionic tube having at least a cathode, a control electrode and an anode responsive to said input signals for discharging said capacitor during a portion of each cycle of said input signals, an automatic bias circuit for said control electrode having a time constant long with respect to the lowest frequency to be measured for biasing said electrode only in response to said input signals, an integrating circuit, means for applying the resulting charges on said capacitor to said integrating circuit, and means for deriving a voltage from said integrating circuit of amplitude which is an inverse function of said input signal frequency, said derived voltage being of a uniform minimum value in the absence of input signals.

RALPH S. HOLMES.

REFERENCES CITED

The following references are of record in the file of this patent:

UNITED STATES PATENTS

| Number | Name | Date |
| --- | --- | --- |
| 2,019,769 | Poole | Nov. 5, 1935 |
| 2,119,389 | Hunt | May 31, 1938 |
| 2,161,146 | Echlin et al. | June 6, 1939 |
| 2,260,933 | Cooper | Oct. 28, 1941 |
| 2,325,927 | Wilbur | Aug. 3, 1943 |
| 2,337,328 | Hathaway | Dec. 21, 1943 |
| 2,363,810 | Schrader et al. | Nov. 28, 1944 |